(12) United States Patent
Liang

(10) Patent No.: US 9,084,092 B2
(45) Date of Patent: Jul. 14, 2015

(54) COMMUNICATION SYSTEM, COMMUNICATION CONTROL METHOD, MOBILE STATION, AND BASE STATION

(71) Applicant: JVC KENWOOD CORPORATION, Yokohama-shi (JP)

(72) Inventor: Yu Feng Liang, Tokyo (JP)

(73) Assignee: JVC KENWOOD CORPORATION (JP)

( * ) Notice: Subject to any disclaimer, the term of this patent is extended or adjusted under 35 U.S.C. 154(b) by 180 days.

(21) Appl. No.: 13/875,365

(22) Filed: May 2, 2013

(65) Prior Publication Data

US 2013/0303227 A1    Nov. 14, 2013

(30) Foreign Application Priority Data

May 10, 2012    (JP) ................................. 2012-108835

(51) Int. Cl.
*H04W 4/08*    (2009.01)

(52) U.S. Cl.
CPC ........................................ *H04W 4/08* (2013.01)

(58) Field of Classification Search
CPC ........... H04W 4/08; H04W 4/00; H04W 4/06; H04W 8/18; H04W 8/186; H04W 8/20; H04W 8/205; H04W 12/06; H04W 24/04; H04W 76/021; H04W 88/14; H04W 88/16
USPC .............. 455/518, 519, 414.1, 412, 413, 509, 455/464, 90.2, 515, 426, 445; 709/204; 370/328, 401, 342, 441, 352; 340/7.1; 345/156, 1.3; 375/224
See application file for complete search history.

(56) References Cited

U.S. PATENT DOCUMENTS

| | | | |
|---|---|---|---|
| 6,118,771 A * | 9/2000 | Tajika et al. | 370/328 |
| 6,757,531 B1 * | 6/2004 | Haaramo et al. | 455/414.1 |
| 2003/0125059 A1 * | 7/2003 | Collins | 455/509 |
| 2004/0042438 A1 * | 3/2004 | Jiang et al. | 370/342 |
| 2005/0164727 A1 * | 7/2005 | Hasegawa | 455/519 |
| 2005/0192041 A1 * | 9/2005 | Oxley et al. | 455/519 |
| 2005/0265313 A1 * | 12/2005 | Poikselka | 370/352 |
| 2007/0263560 A1 * | 11/2007 | Saarisalo et al. | 370/328 |
| 2009/0270048 A1 * | 10/2009 | Wolff | 455/90.2 |
| 2010/0016007 A1 * | 1/2010 | Satake | 455/518 |
| 2011/0255584 A1 * | 10/2011 | Dateki | 375/224 |
| 2012/0249415 A1 * | 10/2012 | Nakajima et al. | 345/156 |

FOREIGN PATENT DOCUMENTS

JP    11196029    7/1999

* cited by examiner

*Primary Examiner* — Tan Trinh
(74) *Attorney, Agent, or Firm* — Cantor Colburn LLP

(57) ABSTRACT

Process loads of a base station and a mobile station are reduced when setting a group with respect to a plurality of mobile stations. The base station stores group information corresponding to a group assignable to a wireless device in association with the wireless device. The base station transmits group information to the wireless device through a relay station according to an authentication request from the wireless device. The base station generates call information defining a group requesting participation. The base station transmits call information to the wireless device through the relay station. The wireless device determines whether the group defined by call information and received from the base station includes the group corresponding to group information. The wireless device participates in the group determined to be included. The wireless device performs a data communication with other wireless devices participating in the group through the relay station.

10 Claims, 13 Drawing Sheets

| WIRELESS DEVICE | GROUP INFORMATION |
|---|---|
| WIRELESS DEVICE 20 | 0 0 0 1 0 0 0 1 |
| WIRELESS DEVICE 30 | 0 0 0 0 0 0 0 1 |
| WIRELESS DEVICE 40 | 1 0 0 1 0 0 0 0 |
| WIRELESS DEVICE 50 | 0 0 0 0 0 0 1 0 |

FIG. 11

| WIRELESS DEVICE | GROUP ID |
|---|---|
| WIRELESS DEVICE 20 | 9004, 9008 |
| WIRELESS DEVICE 30 | 9008 |
| WIRELESS DEVICE 40 | 9001, 9004 |
| WIRELESS DEVICE 50 | 9007 |

COMMUNICATION SYSTEM, COMMUNICATION CONTROL METHOD, MOBILE STATION, AND BASE STATION

CROSS-REFERENCE TO RELATED PATENT APPLICATIONS

This application claims the benefit of Japanese Patent Application No. 2012-108835, filed on May 10, 2012, in the Japan Patent Office, the disclosure of which is incorporated herein in its entirety by reference.

BACKGROUND OF THE INVENTION

1. Field of the Invention

The present invention relates to a communication system, a communication control method, a mobile station, and a base station.

2. Description of the Related Art

In a communication system performing a data communication between a plurality of mobile stations, such as wireless devices, and a base station, intrinsic identification information is set in each mobile station. When a mobile station is turned on, the mobile station makes a request to the base station for self-authentication by using the intrinsic identification information therein. As such, a communication is established between each mobile station and the base station as each mobile station is authenticated by the base station, and thus the mobile stations may perform the data communication with each other.

In the communication system, a group number may be assigned to each mobile station in the communication system. Mobile stations assigned with the same group number form a group, and the mobile stations in the group may perform the data communication with each other.

For example, Patent Reference 1 discloses a system wherein a wireless apparatus that is a main device assigns a group identification number to a plurality of wireless apparatuses that are sub-devices. According to the system of Patent Reference 1, a new group may be dynamically set.

However, according to the system of Patent Reference 1, in order to set a new group, a sub-device has to request a group identification number from the main device. The main device receiving the request has to search for and store a group identification number that does not overlap with the group identification number on using. Also, since the main device transmits a group identification number only to the sub-device that requested the group identification number, the sub-device that received the group identification number has to notify other sub-devices that are added to the group of beginning of a communication in the group.

As such, whenever a group is set, the base station and the mobile station have to perform a plurality of processes, and thus if the number of mobile stations is larger, a central processing unit (CPU), memory, or the like of the base station and mobile station are burdened.

3. Prior Art Reference (Patent Reference 1) Japanese Laid-Open Patent Publication No. hei 11-196029

SUMMARY OF THE INVENTION

The present invention provides a communication system, a communication control method, a mobile station, and a base station, which are capable of reducing process loads of a base station and a mobile station when a group is set for a plurality of mobile stations.

According to an aspect of the present invention, there is provided a communication system including a base station and a plurality of mobile stations, wherein the base station includes: a first storage unit which stores group information corresponding to a group assignable to each of the plurality of mobile stations in association with the mobile station; a generator which generates call information defining a group requesting the mobile station to participate; a group information transmitter which transmits the group information associated with the mobile station and stored in the first storage unit to the mobile station according to an authentication request from the mobile station; and a call information transmitter which transmits the call information generated by the generator to the mobile station, and each of the plurality of mobile stations comprises: a second storage unit which stores group information received from the base station; a determining unit which determines whether a group defined by call information received from the base station includes a group corresponding to the group information stored in the second storage unit; a controller which makes a self-device participate in the group determined to be included by the determining unit; and a communicator which transmits and receives data to and from the mobile station forming the group in which the self-device participates.

According to another aspect of the present invention, there is provided a communication control method performed by a communication system including a base station and a plurality of mobile stations, the communication control method including: firstly storing group information corresponding to a group assignable to each of the plurality of mobile stations in association with the mobile station, wherein the firstly storing is performed by the base station: transmitting the group information, which is associated to the mobile station and stored by the firstly storing, to the mobile station according to an authentication request from the mobile station, wherein the transmitting is performed by the base station; secondly storing group information received from the base station, wherein the secondly storing is performed by each of the plurality of mobile stations; generating call information defining a group requesting the mobile station to participate, wherein the generating is performed by the base station; transmitting the generated call information to the mobile station, wherein the transmitting is performed by the base station; determining whether a group defined by call information received from the base station includes a group corresponding to the group information stored by the secondly storing, wherein the determining is performed by each of the plurality of mobile stations; making a self-device participate in the group determined to be included by the determining, wherein the participating is performed by each of the plurality of mobile stations; and transmitting and receiving data to and from the mobile station forming the group in which the self-device participates, wherein the transmitting and receiving is performed by each of the plurality of mobile stations.

According to another aspect of the present invention, there is provided a mobile station of a communication system including a base station and a plurality of mobile stations, the mobile station including: a storage unit which stores group information corresponding to a group assignable to a self-device; a determining unit which determines whether a group requested to participate and defined by call information received from the base station includes a group corresponding to the group information stored in the storage unit; a controller which makes a self-device participate in the group determined to be included by the determining unit; and a communicator which transmits and receives data to and from the mobile station forming the group in which the self-device participates.

According to another aspect of the present invention, there is provided a base station of a communication system including a base station and a plurality of mobile stations, the base station including: a storage unit which stores group information corresponding to a group assignable to each of the plurality of mobile stations in association with the mobile station; a generator which generates call information making the mobile station participate in the group including the group corresponding to the group information; a group information transmitter which transmits the group information associated with each of the plurality of mobile stations and stored in the storage unit to the mobile station according to an authentication request from the mobile station; and a call information transmitter which transmits the call information generated by the generator to the mobile station.

BRIEF DESCRIPTION OF THE DRAWINGS

The above and other features and advantages of the present invention will become more apparent by describing in detail exemplary embodiments thereof with reference to the attached drawings in which:

FIG. 6 is a diagram showing a format of group information;

FIG. 7 is a table showing group information associated to each wireless device, according to the first embodiment of the present invention;

FIG. 11 is a table showing group information associated to each wireless device, according to a second embodiment of the present invention;

DETAILED DESCRIPTION OF THE INVENTION

One or more embodiments of the present invention will be described in detail with reference to the attached drawings.
(First Embodiment)

Figure 1:
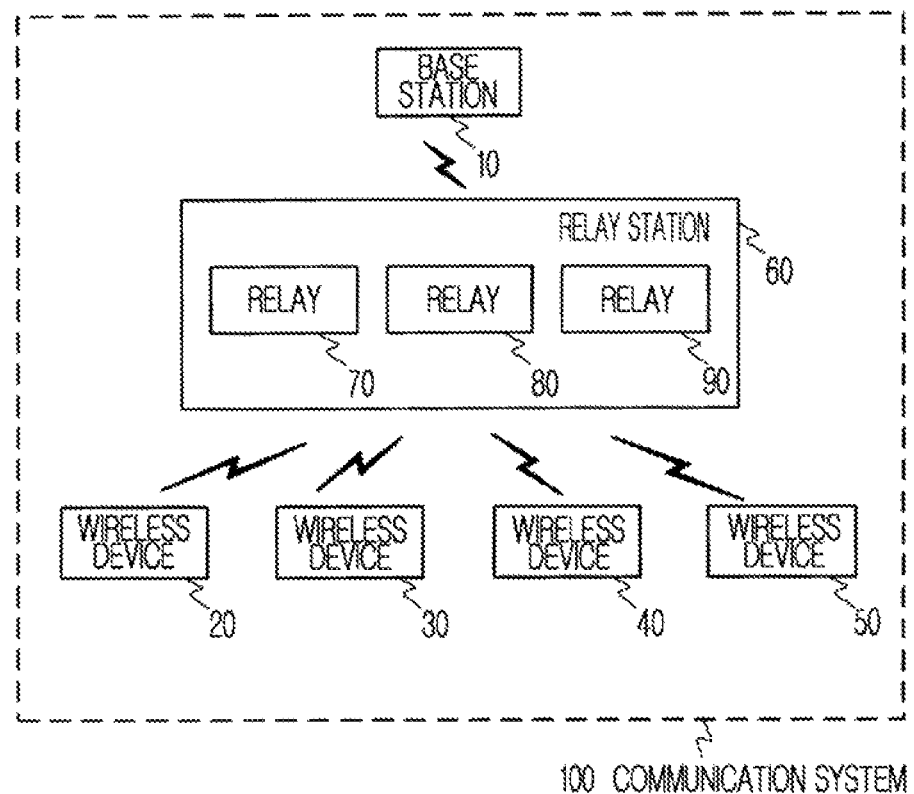
FIG. 1 is a block diagram showing an overall structure of a communication system according to a first embodiment of the present invention.

First, a first embodiment will be described. An overall structure of a communication system 100 according to the present embodiment will be described. FIG. 1 is a block diagram showing the overall structure of the communication system 100. The communication system 100 includes a base station 10, wireless devices 20, 30, 40, and 50 (hereinafter, referred to as wireless devices 20, etc), and a relay station 60.

The base station 10 is, for example, a wireless apparatus connected to a console operated by an operator or the like. The base station 10 transmits data by using a transmitting frequency to each of the wireless devices 20, etc. Also, the base station 10 receives data from each of the wireless devices 20, etc. by using a receiving frequency different from the transmitting frequency.

The wireless devices 20, etc. are, for example, transceivers. The wireless device 20, etc. include a call function, etc. The wireless device 20 transmits and receives data according to a call or the like to and from a base station and the wireless devices 30, 40, and 50 by using a predetermined frequency. A communication method between the wireless device 20 and the wireless device 30 is, for example, a half-duplex method. According to half-duplex communication, the wireless devices 20, etc. transmit data by using the transmitting frequency, if a predetermined button is pressed according to a push-to-talk (PTT) method. On the other hand, if the predetermined button is released, the wireless device 20 receives data by using the receiving frequency that is different from the transmitting frequency.

A wireless communication between the base station 10 and the wireless devices 20, etc., and a wireless communication between the wireless devices 20 through 50 are relayed by the relay station 60. The relay station 60 is provided on a roof or the like of a high building in order to increase reception sensitivity of electric waves. As such, the relay station 60 may cover a wide communication area range.

The relay station 60 includes a plurality of relays 70, 80, and 90 (hereinafter, referred to as relays 70, etc). The relays 70, eta are, for example, repeaters. The relays 70, etc. transmit and receive data simultaneously to and from the base station 10 or the wireless devices 20, etc. by using different frequencies so as to relay the data between the base station 10 and the wireless devices 20, etc. and between the wireless devices 20 through 50. In detail, for example, the relays 70, etc. receive data from the wireless device 20 by using the receiving frequency and transmits data to the wireless device 20 by using the transmitting frequency.

The relay 70 transmits and receives data by using one intrinsic set of a transmitting frequency and a receiving frequency, as a call channel. Thus, the relay station 60 may include the plurality of relays 70, etc. to use a plurality of call channels.

The relay station 60 includes a trunking function for sharing a frequency with the wireless devices 20, etc. Accordingly, for example, the relay 70 from among the relays 70, etc. included in the relay station 60 uses a transmitting frequency and a receiving frequency particular to a control channel. The base station 10 and the wireless devices 20, etc. receive data by using the transmitting frequency of the control channel during standby. Accordingly, the relay 70 transmits data by using the transmitting frequency of the control channel, thereby simultaneously transmitting the data to the base station 10 and the wireless devices 20, etc.

In the communication system 100, the wireless devices 20, etc. may form a group. For example, when the wireless device 20 and the wireless device 30 are in a group A and the wireless device 40 and the wireless device 50 are in a group B, the wireless device 20 may communicate with the wireless device 30 through the relay station 60, but not with the wireless device 40 and the wireless device 50 in the group B.

A group may be classified into a general group and a temporary group. The general group is predetermined according to specifications and operation states of the base station 10 and the wireless devices 20, etc., and is set for each of the wireless devices 20, etc. The general group is fixed, and the setting of the general group is rarely changed except for the case of performing the maintenance of the wireless devices 20, etc.

On the other hand, the temporary group is expected to be temporarily used, and the setting of the temporary group may be frequently changed. By changing the setting of the temporary group, for example, it is possible to change the wireless devices 20, etc. forming a group, prepare a new group, or release a group. The temporary group is set by the base station 10. Hereinafter, a group denotes a temporary group.

Transmitting and receiving data in the wireless devices 20, etc. forming a same group may be performed by the trunking function of the relay station 60. For example, when the wireless device 20 is called to group by the base station 10 by using a transmitting frequency of a control channel, the wireless device 20 shifts to a call channel of the relay 80 assigned by the relay station 60. Then, the wireless device 20 transmits and receives data to and from the wireless devices 30 and 40 forming the group through the relay 80, by using a transmitting frequency and a receiving frequency of the call channel.

Figure 2:
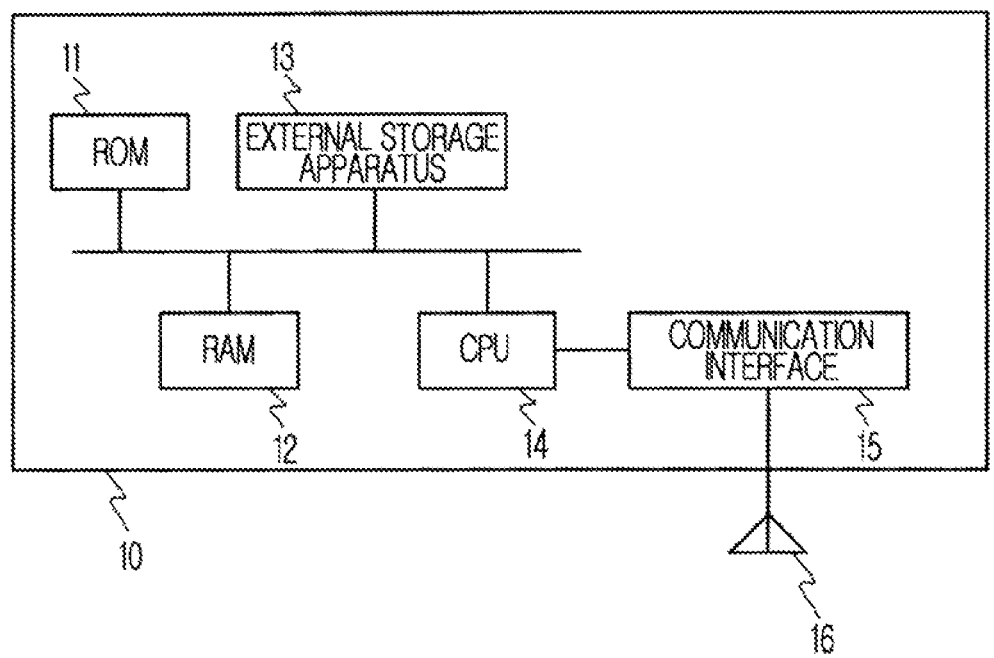
FIG. 2 is a block diagram showing a hardware structure of a base station of FIG. 1.

Next, a hardware structure of the base station 10 will be described. FIG. 2 is a block diagram showing the hardware structure of the base station 10. The base station 10 includes a read only memory (ROM) 11, a random access memory (RAM) 12, an external storage apparatus 13, a central processing unit (CPU) 14, a communication interface 15, and an antenna 16. The ROM 11, the RAM 12, the external storage apparatus 13, and the CPU 14 are connected to each other via a bus therein. Also, the CPU 14 is connected to the communication interface 15 via a communication cable. The communication interface 15 is connected to the antenna 16.

The ROM 11 stores initial programs for performing various initial settings, a hardware examination, software program loading, etc. The ROM 11 may be, for example, a rewritable nonvolatile memory, such as a flash memory.

The RAM 12 temporarily stores various software programs executed by the CPU 14, data required to execute the software programs, etc. The RAM 12 may be, for example, a rewritable nonvolatile memory, such as a flash memory, which does not require power supply, a NOR type flash memory having excellent read speed and random access, and a NAND type flash memory having excellent integration and write speed.

The external storage apparatus 13 is, for example, a hard disk, and stores various software programs and various types of data, such as parameters required to execute the software programs. The software programs include an application software program, a basic software program, such as an operating system (OS), etc.

The CPU 14 reads a software program stored in the external storage apparatus 13 to the RAM 12 and controls execution of the software program, thereby realizing functions described later.

The communication interface 15 includes a transceiver circuit or the like. The communication interface 15 performs a data process or the like, according to a wireless communication with the relay station 60 by using the transceiver circuit. The communication interface 15 transmits and receives electric waves including data to and from the relay station 60 through the antenna 16.

Figure 3:
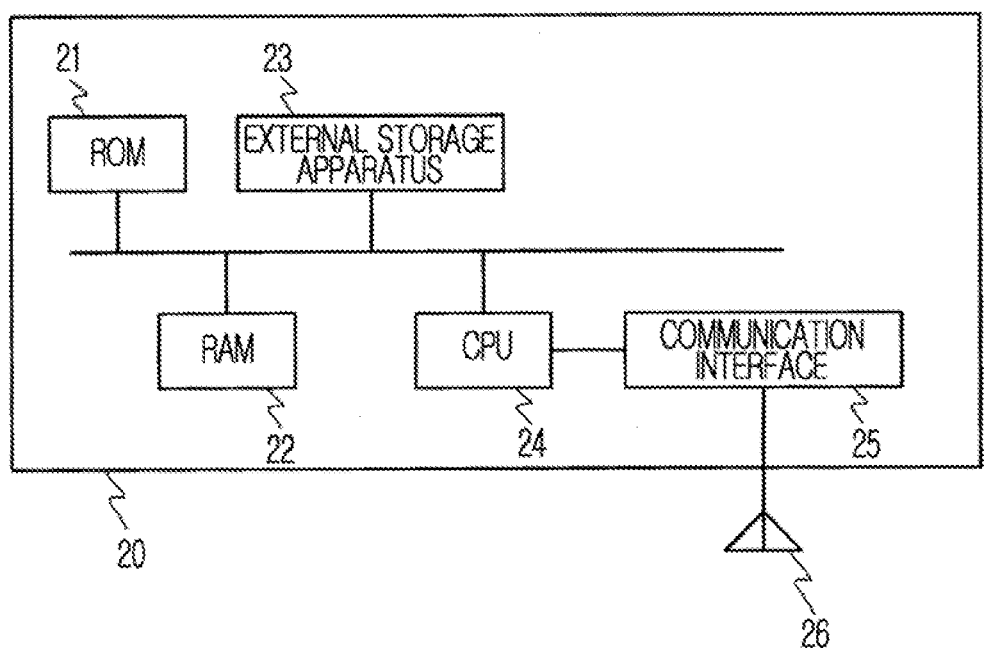
FIG. 3 is a block diagram showing a hardware structure of a wireless device of FIG. 1.

Next, a hardware structure of the wireless device 20 will be described. FIG. 3 is a block diagram showing the hardware structure of the wireless device 20. The wireless device 20 includes a ROM 21, a RAM 22, an external storage apparatus 23, a CPU 24, a communication interface 25, and an antenna 26. The ROM 21, the RAM 22, the external storage apparatus 23, and the CPU 24 are connected to each other via a bus therein. Also, the CPU 24 is connected to the communication interface 25 via a communication cable. The communication interface 25 is connected to the antenna 26.

The ROM 21, the RAM 22, the external storage apparatus 23, and the CPU 24 are the same as the ROM 11, the RAM 12, the external storage apparatus 13, and the CPU 14, respectively.

The communication interface 25 includes a transceiver circuit or the like. The communication interface 25 performs a data process or the like according to a wireless communication with the relay station 60 by using the transceiver circuit. The communication interface 25 transmits and receives electric waves including data to and from the relay station 60, through the antenna 26.

Also, hardware structures of the wireless devices 30, 40, and 50 are the same as that of the wireless device 20.

Figure 4:
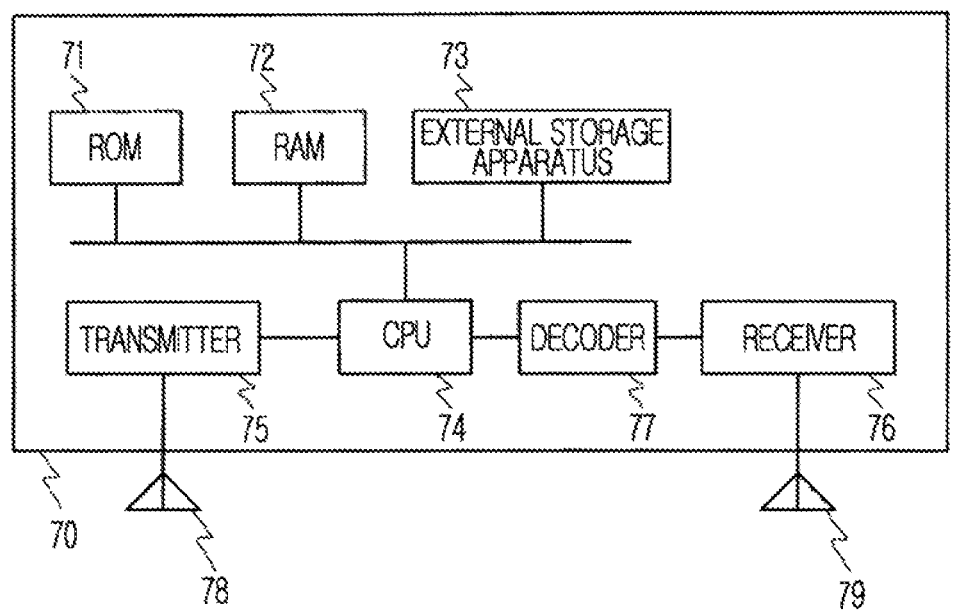
FIG. 4 is a block diagram showing a hardware structure of a relay of FIG. 1.

Next, a hardware structure of the relay 70 forming the relay station 60 will be described. FIG. 4 is a block diagram showing the hardware structure of the relay 70. The relay 70 includes a ROM 71, a RAM 72, an external storage apparatus 73, a CPU 74, a transmitter 75, a receiver 76, a decoder 77, an antenna 78, and an antenna 79. The ROM 71, the RAM 72, the external storage apparatus 73, and the CPU 74 are connected to each other via a bus therein. The CPU 74 is connected to the transmitter 75 and the decoder 77 via a bus. The decoder 77 is connected to the receiver 76 via an exclusive bus. The transmitter 75 and the receiver 76 are connected to the antenna 78 and the antenna 79, respectively.

The ROM 71, the RAM 72, the external storage apparatus 73, and the CPU 74 are the same as the ROM 11, the RAM 12, the external storage apparatus 13, and the CPU 14, respectively.

The transmitter 75 includes a transmitting circuit or the like. The transmitter 75 performs a data process or the like according to a wireless communication with the base station 10 or the wireless devices 20, etc., by using the transmitting circuit. The transmitter 75 transmits electric waves including data to the base station 10 or the wireless devices 20, etc. through the antenna 78.

The receiver 76 includes a receiving circuit or the like. The receiver 76 performs a data process or the like according to a wireless communication with the base station 10 or the wireless devices 20, etc. by using the receiving circuit. The receiver 76 receives electric waves including data from the base station 10 or the wireless devices 20, etc. through the antenna 79.

The decoder 77 detects a predetermined signal included in the electric waves received by the receiver 76. Upon detecting the predetermined signal, the decoder 77 inputs a signal for turning on the transmitter 75 to the CPU 74. Then, the CPU 74 transmits the data received by the receiver 76 to the base station 10 or the wireless devices 20, etc. through the transmitter 75.

Here, hardware structures of the relays 80 and 90 are the same as that of the relay 70. The relay station 60 controls the relays 70, etc. to relay a data communication in the communication system 100.

Next, a functional structure of the base station 10 will be described with reference to FIG. 5.

Figure 5:
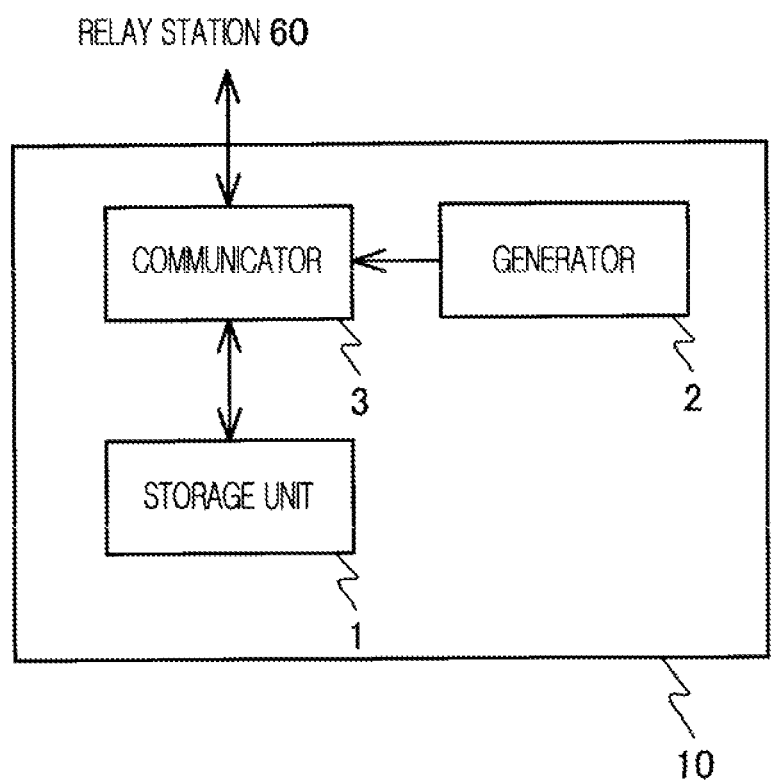
FIG. 5 is a block diagram showing a functional structure of a base station of FIG. 1.

As shown in FIG. 5, the base station 10 includes a storage unit 1 (a first storage unit), a generator 2, and a communicator 3 (a group information transmitter and a call information transmitter). The storage unit 1 is built in a storage area of the external storage apparatus 13.

The storage unit 1 stores group information corresponding to a group assignable to each of the wireless devices 20, etc. by associating the group information with the wireless devices 20, etc. For example, as shown in FIG. 6, the group information is data defined by a predetermined bit number. The bit number is determined by the number of groups. Here, since it is assumed that there are eight groups from a group 9001 to a group 9008, the group information is defined to be in eight bits. From left, a first bit denotes the group 9001, a second bit denotes the group 9002, a third bit denotes the group 9003, a fourth bit denotes the group 9004, a fifth bit denotes the group 9005, a sixth bit denotes the group 9006, a seventh bit denotes the group 9007, and an eighth bit denotes the group 9008. When a bit is "1", the wireless devices 20, etc. may be assigned to a group corresponding to the bit. On the other hand, when a bit is "0", the wireless devices 20, etc. are unable to be assigned to a group corresponding to the bit.

For example, as shown in FIG. 7, the storage unit 1 stores group information in association with each of the wireless devices 20, etc. Since the group information associated with the wireless device 20 is "00010001", the wireless device 20 may be assigned to the group 9004 and the group 9008. Since the group information associated with the wireless device 30 is "00000001", the wireless device 30 may be assigned to the group 9008. Since the group information associated with the wireless device 40 is "10010000", the wireless device 40 may be assigned to the group 9001 and the group 9004. Since the group information associated with the wireless device 50 is "00000010", the wireless device 50 may be assigned to the group 9007.

The generator 2 generates call information defining a group requesting the wireless devices 20, etc. to participate. The call information has the same form as the group information. For example, the generator 2 generates call information "00010001" when the groups 9004 and 9008 are set. In the call information, a group corresponding to a bit "1" requests the wireless devices 20, etc. to participate. In other words, the call information "00010001" defines that the groups 9004 and 9008 are groups requesting the wireless devices 20, etc. to participate. Also, the generator 2 is implemented by the CPU 14.

Referring back to FIG. 5, the communicator 3 transmits and receives data to and from the relay station 60 according to a wireless communication. In detail, the communicator 3 performs frequency transformation, demodulation, or the like with respect to a signal included in the electric waves received from the relay station 60. The communicator 3 performs frequency transformation, modulation, or the like with respect to a baseband signal so as to generate a signal included in the electric waves transmitted to the relay station 60. The communicator 3 is implemented by the CPU 14 and the communication interface 15.

The communicator 3 operates as a group information transmitter, and transmits the group information associated with the wireless device 20 and stored in the storage unit 1 to the wireless device 20, according to an authentication request from the wireless device 20. For example, when a self-device is turned on, the wireless device 20 transmits data requesting authentication of the self-device, such as an intrinsic identification (ID), to the base station 10 through the relay station 60 in order to establish a data communication with the base station 10. Upon receiving the data from the wireless devices 20, etc. through the relay station 60, the communicator 3 transmits the group information associated with the wireless device 20 and stored in the storage unit 1 to the wireless device 20 through the relay station 60. Similarly, upon receiving the data from the wireless devices 30, 40, and 50 through the relay station 60, the communicator 3 transmits the group information associated with the wireless devices 30, 40, and 50 and stored in the storage unit 1 to the wireless devices 30, 40, and 50 through the relay station 60, respectively.

The communicator 3 operates as a call information transmitter, and simultaneously transmits the call information generated by the generator 2 to each of the wireless devices 20, etc. through the relay station 60. For example, the communicator 3 transmits the call information "00010001" to the relay station 60. Upon receiving the call information, the relay station 60 simultaneously transmits the call information "00010001" to the wireless devices 20, etc. by using the transmitting frequency of the control channel. Accordingly, the wireless devices 20, etc. receive the same call information.

Figure 8:
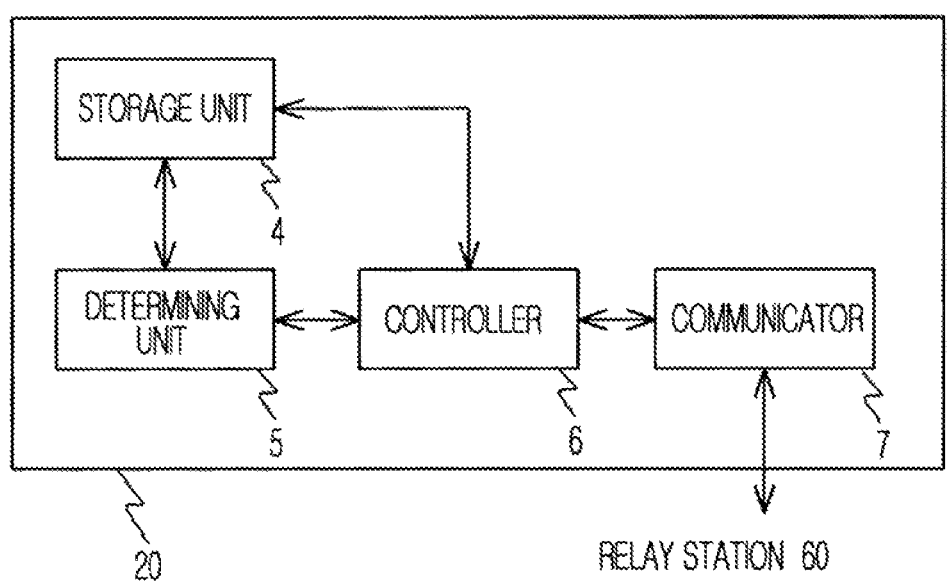
FIG. 8 is a block diagram showing a functional structure of the wireless device of FIG. 1.

Next, a functional structure of the wireless device 20 will be described with reference to FIG. 8. Here, functional structures of the wireless devices 30, 40, and 50 are the same as that of the wireless device 20 described below.

The wireless device 20 includes a storage unit 4 (a second storage unit), a determining unit 5, a controller 6, and a communicator 7. The storage unit 4 is built in a storage area of the external storage apparatus 23.

The storage unit 4 stores group information received from the base station 10. The base station 10 transmits the group information "00010001" shown in FIG. 7 to the wireless device 20 through the relay station 60. The storage unit 4 stores the group information "00010001" received through the relay station 60. The base station 10 transmits group information "00000001", "10010000", and "00000010" respectively to the wireless devices 30, 40, and 50 through the relay station 60. The storage units 4 of the wireless devices 30, 40, and 50 store the group information received through the relay station 60.

The determining unit 5 determines whether a group defined by call information received from the base station 10 through the relay station 60 includes a group corresponding to the group information stored in the storage unit 4. The determining unit 5 determines whether the group defined by the call information includes the group corresponding to the group information according to an operation result of the group information and the call information. For example, the determining unit 5 performs the determination by using an AND operation of the group information and the call information. In the AND operation, data of two same bit numbers is input, and data of a same bit number is output by performing an operation on bits in the same locations. Here, when the bits in the same locations of the input data are "1", a bit in the corresponding location of the output data is "1". When the bits in the same locations of the input data are "1" and "0" or "0" and "0", the bit in the corresponding location of the output data is "0".

The group information stored in the storage unit 4 is "00010001". In this regard, the call information is "00010001". When an AND operation of the group information and the call information is performed, "00010001" is output. Accordingly, the determining unit 5 determines that the groups 9004 and 9008 corresponding to the bit "1" are included in the group defined by the call information.

In the wireless device 30, the group information stored in the wireless device 30 is "00000001". In this regard, the call information received from the base station 10 is "00010001". Thus, in the wireless device 30. "00000001" is output according to an AND operation, and it is determined that the group 9008 is included in the group defined by the call information.

In the wireless device 40, the group information stored in the wireless device 40 is "10010000". In this regard, the call information received from the base station 10 is "00010001". Thus, in the wireless device 40, "0001000" is output according to an AND operation, and it is determined that the group 9004 is included in the group defined by the call information.

In the wireless device 50, the group information stored in the wireless device 50 is "00000010". In this regard, the call information received from the base station 10 is "00010001". Thus, in the wireless device 40, "00000000" is output according to an AND operation, and it is determined that no group corresponding to the group information is included in the group defined by the call information, The controller 6 makes a self-device participate in the group determined to be included by the determining unit 5. Here, when a plurality of groups are determined to be included, the controller 6 makes the self-device participate in the group having a highest priority from the plurality of groups. In the present embodiment, it is determined that the group 9001 has a highest priority and the priority decreases from the group 9001 towards the group 9008.

For example, the controller 6 makes the self-device participate in the group by controlling the communicator 7 to transmit and receive data by using the transmitting frequency and the receiving frequency of the call channel assigned to the group by the relay station 60.

When the self-device participates in the group, the controller 6 stores the group in which the self-device participates in the storage unit 4. Accordingly, the controller 6 refers to the storage unit 4 to recognize the group in which the self-device participates.

In the above example, the controller 6 makes the wireless device 20 participate in the group 9004 having a higher priority from among the groups 9004 and 9008 determined to be included by the determining unit 5. Also, the wireless device 30 participates in the group 9008. The wireless device 40 participates in the group 9004. The wireless device 50 does not participate in any group. As a result, the group 9004 in which the wireless device 20 and the wireless device 40 participate and the group 9008 in which the wireless device 30 participates are set.

The communicator 7 transmits and receives data to and from the relay station 60 via a wireless communication. In detail, the communicator 7 performs frequency transformation, demodulation, or the like with respect to the signal included in the electric waves received from the relay station 60. The communicator 7 performs frequency transformation, modulation, or the like with respect to the baseband signal in order to generate the signal included in the electric waves transmitted to the relay station 60.

The communicator 7 transmits and receives various types of data to and from the base station 10 through the relay station 60. For example, when the self-device is turned on, the communicator 7 transmits data requesting authentication of the ID of the self-device to the base station 10 through the relay station 60.

The communicator 7 transmits and receives data to and from the wireless devices 30, etc. forming the group in which the self-device participates. For example, the communicator 7 transmits and receives the data to and from the wireless device 30 in the same group by using the transmitting frequency and the receiving frequency of the call channel assigned by the relay station 60. The communicator 7 is implemented by the CPU 24 and the communication interface 25.

For example, according to the transmitting and receiving of the data in the group including the wireless device 20 and the wireless device 30, the wireless device 20 transmits the data to the relay station 60 by using the transmitting frequency of the call channel assigned to the group by the relay station 60. The relay station 60 receives the data transmitted from the wireless device 20 by using the transmitting frequency of the call channel. Then, the relay station 60 transmits the data to the wireless device 30 by using the receiving frequency of the call channel. The wireless device 30 receives the data transmitted from the relay station 60 by using the receiving frequency of the call channel. As such, the wireless devices 20 and 30 forming the group may transmit and receive data between each other. The transmitting frequency and the receiving frequency of the call channel may be pre-set by the relay station 60 according to groups.

Figure 9:
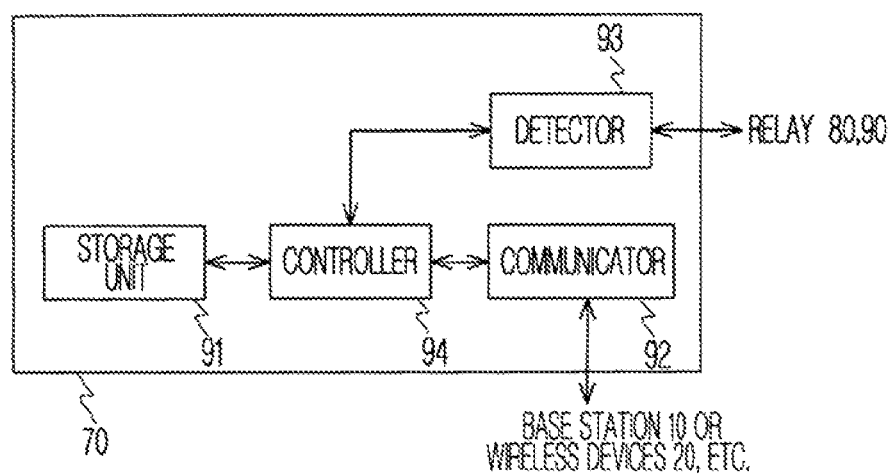
FIG. 9 is a block diagram showing a functional structure of the relay of FIG. 1.

Next, a functional structure of the relay 70 forming the relay station 60 will be described with reference to FIG. 9.

The relay 70 includes a storage unit 91, a communicator 92, a detector 93, and a controller 94. The storage unit 91 is built in a storage area of the external storage apparatus 73.

The storage unit 91 stores various types of data. The storage unit 91 stores addresses assigned to the relays 70, etc., data of a transmitting frequency and a receiving frequency used for relay, or the like.

The communicator 92 transmits and receives data to and from the base station 10 or the wireless devices 20, etc. according to a wireless communication. In detail, for example, the communicator 92 performs frequency transformation, demodulation, or the like with respect to the signal included in the electric waves received from the base station 10, the wireless device 20, etc. The communicator 92 performs frequency transformation, modulation, or the like with respect to the baseband signal in order to generate the signal included in the electric waves transmitted to the base station 10, the wireless device 20, etc.

The detector 93 detects a using state of a channel with respect to the relays 80 and 90 by communicating with the relays 80 and 90. For example, the relay 70 for the control channel detects the using state of the channel with respect to the relays 80 and 90 for the call channel, and notifies the controller 94 of information about the relays 80 and 90, such as the using state.

The controller 94 obtains the information about the relays 80 and 90 from the detector 93. If the base station 10 or the wireless device 20 makes a request for a communication, the controller 94 instructs the relay 80 or 90 for the call channel that is not under communication to perform a relay operation through the detector 93, and instructs the base station 10 or the wireless device 20 that makes a request for the communication through the communicator 92 to perform the call channel.

Figure 10:
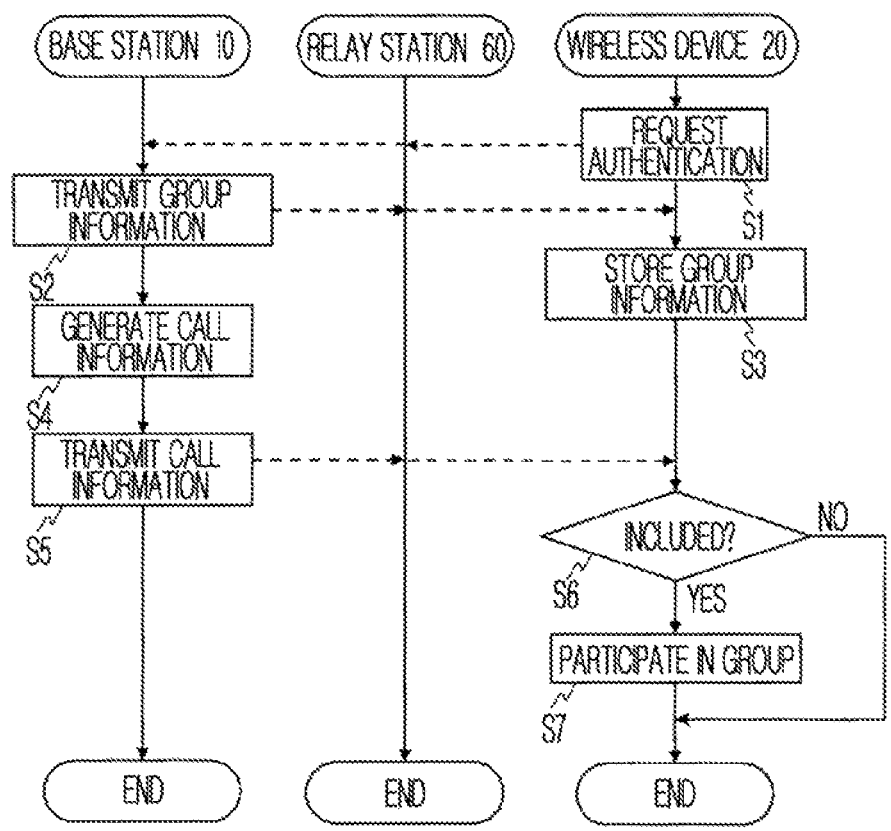
FIG. 10 is a flowchart showing a group setting process according to the first embodiment of the present invention.

Next, a flow of operations according to a group setting process of the base station 10 and the wireless devices 20, etc. according to the present embodiment will be described with reference to FIG. 10. Also, in the following description of the flow, a flow of operations of the base station 10 and the wireless device 20 is described, but the wireless devices 30, 40, and 50 also operate in the same manner as the wireless device 20.

When the power is turned on, the wireless device 20 transmits data requesting authentication of the ID to the base station 10 through the relay station 60, and makes a request for authentication (operation S1). The communicator 3 of the base station 10 transmits the group information to the wireless device 20 through the relay station 60 (operation S2). Upon receiving the group information, the wireless device 20 stores the group information in the storage unit 4 (operation S3).

Then, the generator 2 of the base station 10 generates the call information (operation S4). The communicator 3 transmits the call information and instructs the relay station 60 to transmit the call information to all wireless devices in the control channel (operation S5).

The wireless device 20 determines whether the group defined by the call information received from the base station 10 includes the group corresponding to the group information stored in the storage unit 4 (operation S6). If the group defined by the call information includes the group corresponding to the group information (Operation S6; Yes), the wireless device 20 participates in the group defined by the call information. Then, the base station 10 and the wireless device 20 end the group setting process.

On the other hand, if the group defined by the call information does not include the group corresponding to the group information (operation S6; No), the wireless device 20 ends the group setting process.

As described in detail above, according to the present embodiment, group information corresponding to an assignable group is pre-stored in the wireless devices 20, etc. Accordingly, the wireless devices 20, etc. may participate in a group by only determining whether the group defined by the call information transmitted from the base station 10 is included in the assignable group. Also, the base station 10 may set a group by only generating the call information and transmitting the call information to the wireless devices 20, etc. Accordingly, when a group is set with respect to a plurality of mobile stations, process loads of the base station 10 and the wireless devices 20, etc. may be reduced.

Also, in the present embodiment, the communicator 3 simultaneously transmits the call information to the wireless devices 20, etc. by using the control channel of the relay station 60. Accordingly, a process according to the transmitting of the call information may be more simplified than the call information is individually transmitted to the wireless devices 20 through 50. Thus, the process load of the base station 10 may be further reduced.

Also, in the present embodiment, when the plurality of groups are determined to be included by the determining unit 5, the controller 6 makes the self-device participate in the group having the highest priority from among the plurality of groups. Accordingly, the base station, for example, may set a group such that the number of wireless devices 20, etc. forming the group is maximum, by changing the priority of a group to which the majority of the wireless devices 20, etc. are assignable to be highest.

Also, according to the present embodiment, the group information and the call information are data defined by pre-determined bit numbers. Accordingly, the group information and the call information are transmitted and received as data in a bit form, thereby suppressing amount of the transmitted and received data. Also, the determining unit 5 determines whether the group defined by the call information includes the group corresponding to the group information according to a result of an AND operation of the group information and the call information. The AND operation is advantageous in processing data at a high speed. However, the determining unit 5 may perform the determination by using the four fundamental arithmetic operations, etc., without being limited to the AND operation.

Also, in the present embodiment, two groups, i.e., the group 9004 and the group 9008, are simultaneously set, but an embodiment of the present invention is not limited thereto. For example, the generator 2 generates call information "00010000" defining the group 9004 in a state that the wireless devices 20 and 40 participate in the group 9004 and the wireless device 30 participates in the group 9008. When the communicator 3 simultaneously transmits the call information to the wireless devices 20, etc. through the relay station 60, the group 9004 including the wireless devices 20 and 40 is maintained and the group 9008 is released according to the result determined by the determining unit 5. As such, since the communication system 100 may set a group according to call information, it is possible to set a group having a high degree of freedom.

(Second Embodiment)

A second embodiment of the present invention will now be described.

In the first embodiment, the group information and the call information are data defined in predetermined bit numbers. In this case, amount of the transmitted and received data may be suppressed, but an upper limit of the number of groups to be set needs to be pre-determined. Thus, in the present embodiment, an aspect that the upper limit of the number of groups doesn't need to be determined will be described.

The hardware structures and functional structures of the base station 10, the wireless devices 20, etc., and the relay station 60 according to the present embodiment are the same as those according to the first embodiment. However, the present embodiment is different from the previous embodiment in that the group information is an intrinsic ID of a group (hereinafter, simply referred to as a group ID).

As shown in FIG. 11 for example, the storage unit 1 of the base station 10 stores group IDs in association with the wireless devices 20, etc., as the group information corresponding to the groups assignable to the wireless devices 20, etc. For example, the storage unit 1 stores "9004" and "9008" in association with the wireless device 20. The storage unit 1 stores "9008" in association with the wireless device 30. The storage unit 1 stores "9001" and "9004" in association with the wireless device 40. The storage unit 1 stores "9007" in association with the wireless device 50. The generator 2 generates "9004, 9008" as the call information, The determining unit 5 interprets the call information "9004, 9008" received from the base station 10 through the relay station 60, and extracts the group IDs "9004" and "9008". The determining unit 5 determines whether the extracted group IDs include a group ID stored in the storage unit 4.

As described in detail above, according to the present embodiment, the group ID is used as the group information. Accordingly, the base station 10 doesn't need to pre-determine the upper limit of the number of groups, and thus may newly set a plurality of groups. As a result, the base station 10 may flexibly set a group.

Also, since a user may employ the group ID as the group information when the number of groups is not clearly determined, and may employ the bit form as the group information when the number of groups is clearly determined, a form of the group information may be selected according to situations when designing a system.

(Third Embodiment)

A third embodiment of the present invention will now be described.

The hardware structures of the base station 10, the wireless devices 20, etc., and the relay station 60 according to the present embodiment are the same as those according to the first embodiment. The present embodiment is different from the first embodiment in the functions of the determining unit 5 and the controller 6.

The determining unit 5 determines whether the group in which the self-device participates is defined in the call information received from the base station 10. For example, when the received call information is "00000000", the determining unit 5 outputs "00000000" as a result of an AND operation of the group information and the call information. When "00000000" is output, the determining unit 5 determines that the group in which the self-device participates is not defined in the call information. Also, when the call information is "00000000" in the wireless devices 30, 40, and 50, the results of AND operations are all "00000000".

When it is determined that the group in which the self-device participates is not defined in the call information by the determining unit 5, the controller 6 releases the self-device from the group. For example, in the first embodiment, the wireless devices 20 and 40 are released from the group 9004 and the wireless device 30 is released from the group 9008. Accordingly, all groups disappear.

Figure 12:
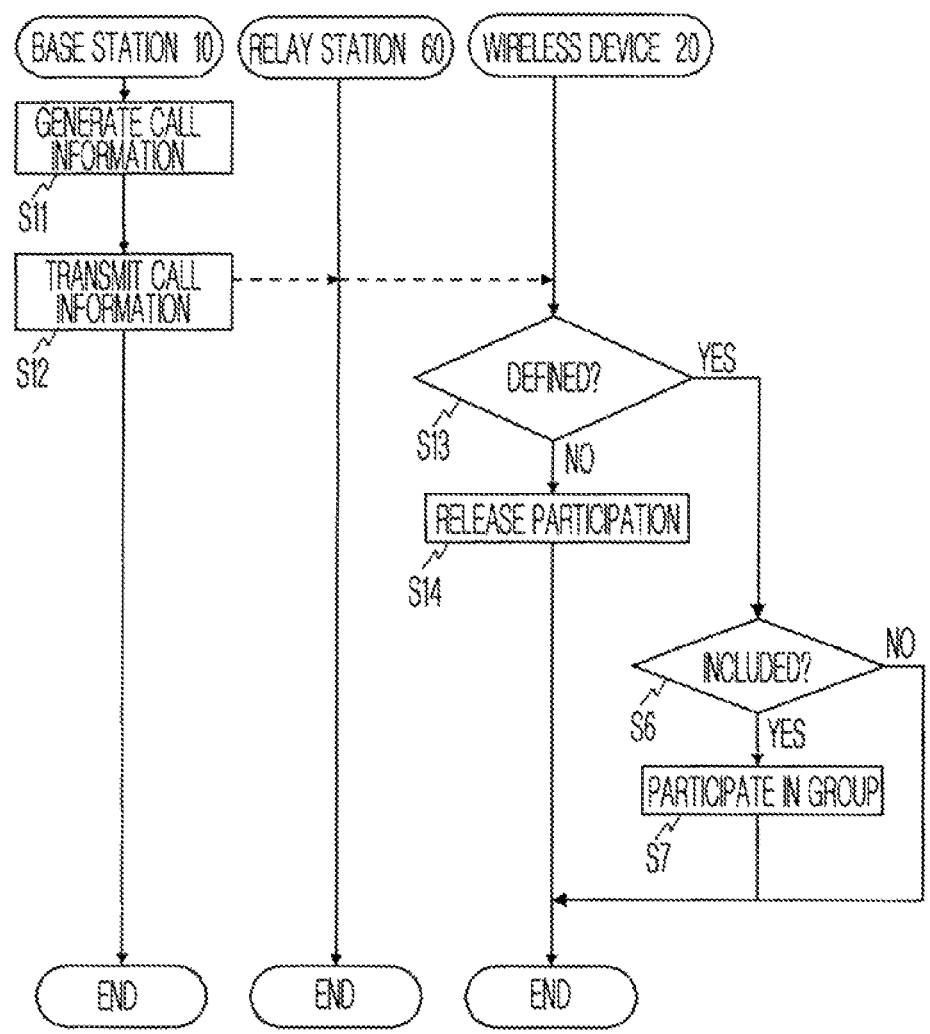
FIG. 12 is a flowchart showing a group releasing process according to a third embodiment of the present invention.

Next, a flow of operations according to a group releasing process of the base station 10 and the wireless devices 20, etc. will be described with reference to FIG. 12. In the description about the flow, it is assumed that the wireless device 20 participates in the group 9004.

The generator 2 generates the call information "00000000" (operation S11). The communicator 3 transmits the generated call information to the wireless device 20 through the relay station 60 (operation S12). Then, the wireless device 20 determines whether the group in which the self-device participates is defined in the call information received from the base station 10 (operation S13).

If the group in which the self-device participates is not defined in the call information (operation S13; No), the wireless device 20 releases the participation in the group 9004 (operation S14). Then the base station 10 and the wireless device 20 end the group releasing process.

On the other hand, if the group in which the self-device participates is defined in the call information (operation S13; Yes), the wireless device 20 performs operations S6 and S7 described in the first embodiment (refer to FIG. 10), and ends the group releasing process.

As described in detail above, according to the present embodiment, if the group in which the self-device participates is not defined in the call information, the wireless devices 20, etc. release the participation in the group. As such, for example, all groups may be easily released by only transmitting the call information "00000000" when a data communication is to be performed in a general group.

Here, the base station 10 may release groups of all mobile stations according to notification information from a control channel, or individually release groups according to a communication with respect to an individual wireless device.

Also, in the present embodiment, the determining unit 5 determines whether the group in which the self-device participates is defined in the call information by using an AND operation. However, the determining is not limited thereto, and for example, the determining unit 5 may determine that the group in which the self-device participates is not defined in the call information without any operation if the call information is "00000000". Also, in the present embodiment, the group information and the call information may be group IDs. In this case, the determining unit 5 may determine that the group in which the self-device participates is not defined in the call information when the call information is empty data.

(Fourth Embodiment)

A fourth embodiment of the present invention will now be described.

In each of the above embodiments, the wireless device 20 may only participate in the group 9004 or 9008 corresponding to the group information stored in the storage unit 4. Thus, in the present embodiment, a case where the wireless device 20 participates in the group 9007 will be described.

The hardware structures of the base station 10 and the wireless devices 20, etc. according to the present embodiment are the same as those of the first embodiment. The present embodiment is different from the first embodiment in functions of the generator 2, the communicator 3, and the storage unit 4.

The generator 2 generates the group information corresponding to the group assignable to the wireless device 20. For example, the generator 2 generates the group information "00000010" indicating that the wireless device 20 may be assigned to the group 9007.

The communicator 3 transmits the group information generated by the generator 2 to the wireless device 20 through the relay station 60. Here, since the group information may be only transmitted to the wireless device 20, the communicator 3 transmits a message including the group information to the wireless device 20 through the relay station 60.

The storage unit 4 of the wireless device 20 stores the group information included in the message received from the base station 10 through the relay station 60. Accordingly, the group information stored in the storage unit 4 is overwritten from "00010001" to "00000010".

At this time, when the call information "00010010" is transmitted from the base station 10 to the wireless device 20 through the relay station 60, the determining unit 5 determines that the group 9007 is included. As a result, the controller 6 makes the self-device participate in the group 9007 determined to be included by the determining unit 5.

When the wireless device 20 restores the group information corresponding to the assignable group, the generator 2 generates the group information "00010001" indicating that the groups 9004 and 9008 are assignable. The base station 10 transmits a message including the group information to the wireless device 20 through the relay station 60, and thus the wireless device 20 may restore the group information corresponding to the assignable group.

Figure 13:
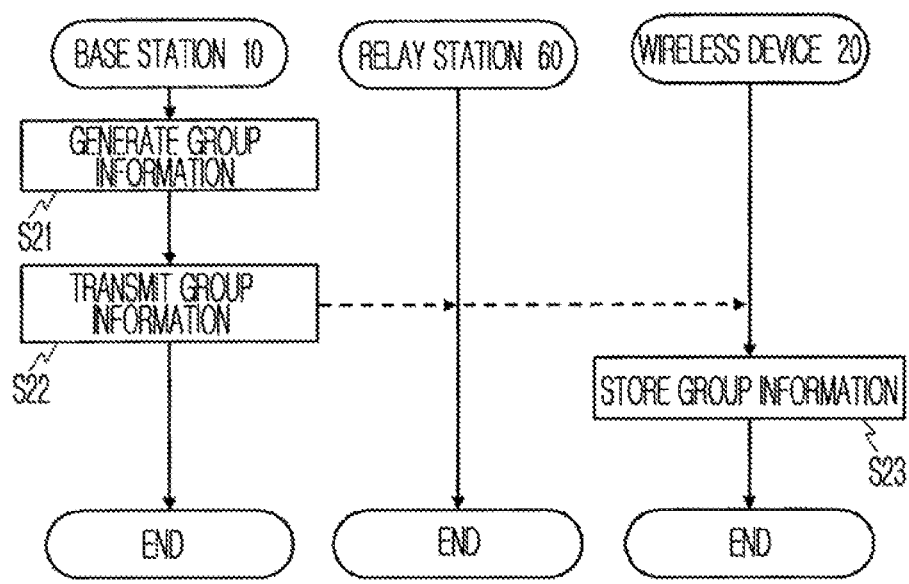
FIG. 13 is a flowchart showing a group setting process according to a fourth embodiment of the present invention.

Next, a flow of operations according to a group setting process of the base station 10 and the wireless devices 20, etc. according to the present embodiment will be described with reference to FIG. 13.

The generator 2 generates the group information (operation S21). The communicator 3 transmits the group information to the wireless device 20 through the relay station 60 (operation S22). Then, the storage unit 4 of the wireless device 20 stores the group information received from the base station 10 (operation S23).

As described in detail above, in the above embodiment, the group information corresponding to the group assignable to the wireless device 20 is generated, and the transmitted group information is stored in the wireless device 20. As such, since the base station 10 may change the group assignable to the wireless device 20, a group may be further flexibly set for the wireless devices 20, etc.

Also, the base station 10 may easily manage groups since the group assignable to the wireless device 20 can be restored by generating the group information and transmitting the generated group information to the wireless device 20.

Also, in each of the above embodiments, the communicator 3 may intermittently transmit the call information to the wireless devices 20, etc. through the relay station 60. As such, when the call information is initially transmitted, the wireless devices 20, etc. which are turned off and not authenticated by the base station 10 may participate in a group at any time. For example, the wireless device 20 that is turned on receives the group information from the base station 10 through the relay station 60 according to an authentication request. At this time, even when the group 9004 is set, the wireless device 20 may participate in the group 9004 by receiving the call information intermittently transmitted.

Also, in each of the above embodiments, the controller 6 may release the self-device from the group in which the self-device participates when the call information is not received from the base station 10 through the relay station 60 for at least a predetermined time interval. For example, when a group is to be set by limiting a period, the base station 10 may automatically release the self-device when the period is expired by not transmitting the call information before a predetermined time of the expiration.

Also, in each of the above embodiments, the data communication between the base station 10 and the wireless devices 20, etc. is relayed by the relay station 60. However, the present invention is not limited thereto, and the base station 10 and the wireless devices 20, etc. may directly transmit and receive data between each other, Also, the antennas 78 and 79 of the relay station 60 may be integrated into one antenna for transmission and reception. Also, the base station 10 may include a dispatch or the like manipulated by an operator.

Also, in each of the above embodiments, the base station 10 generates the call information and transmits the generated call information to the wireless devices 20, etc. through the relay station 60. However, the present invention is not limited thereto, and for example, the wireless device 20 authorized by the base station 10 regarding setting of a group may generate the call information, and transmit the call information to the wireless devices 30, 40, and 50 through the relay station 60.

Also, the wireless devices 20, etc. are not limited to a PTT method, and may alternatively transmit and receive data according to a voice operating relay (VOX) method, wherein transmission and reception are automatically switched by detecting voice.

Also, the wireless devices 20, etc. according to each of the above embodiments may be, for example, a personal digital assistant or personal data assistance (FDA), a personal computer (PC), a digital camera having a communication function, or a game console.

Also, in each of the above embodiments, a software program to be executed may be stored and distributed in a computer-readable recording medium, such as a flexible disc, a compact disc read-only memory (CD-ROM), a digital versatile disc (DVD), or a magneto-optical disc (MO), and a system performing the above processes may be manufactured by installing the software program.

Alternatively, the software program may be stored in a disc apparatus or the like of a predetermined server apparatus on a communication network, such as the Internet, and may be downloaded or the like by, for example, being overlapped in carrier waves.

Also when the above functions are divided and implemented by OSs, or implemented according to a cooperation of an OS and an application software program, or the like, a portion excluding the OS may be stored and distributed in a medium, and downloaded.

According to the present invention, process loads of a base station and a mobile station may be reduced while setting a group with respect to a plurality of mobile stations.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A communication system comprising a base station and a plurality of mobile stations, wherein the base station comprises:
   a first storage unit which stores group information corresponding to a group assignable to each of the plurality of mobile stations in association with the mobile station, the group information being data defined by a predetermined bit number;
   a generator which generates call information defining a group requesting the mobile station to participate, the call information being data defined by a predetermined bit number;
   a group information transmitter which transmits the group information associated with the mobile station and stored in the first storage unit to the mobile station according to an authentication request from the mobile station; and
   a call information transmitter which transmits the call information generated by the generator to the mobile station, and
   each of the plurality of mobile stations comprises:
   a second storage unit which stores group information received from the base station;
   a determining unit which determines, according to an operation result of the group information and the call information, whether a group defined by call information received from the base station includes a group corresponding to the group information stored in the second storage unit;
   a controller which makes a self-device participate in the group determined to be included by the determining unit; and
   a communicator which transmits and receives data to and from the mobile station forming the group in which the self-device participates.

2. The communication system of claim 1, wherein the call information transmitter simultaneously transmits the call information to each of the plurality of mobile stations.

3. The communication system of claim 1, wherein the determining unit determines whether the group in which the self-device participates is defined in the call information, and if it is determined by the determining unit that the group is not defined, the controller releases the self-device from the group in which the self-device participates.

4. The communication system of claim 1, wherein, when a plurality of groups are determined to be included by the determining unit, the controller makes the self-device participate in a group having a highest priority from among the plurality of groups.

5. The communication system of claim 1, wherein the generator generates group information, and the group information transmitter transmits the group information generated by the generator to the mobile station.

6. The communication system of claim 1, wherein the call information transmitter intermittently transmits the call information to each of the plurality of mobile stations.

7. The communication system of claim 1, wherein, when the call information is not received from the base station for a predetermined time interval or more, the controller releases the self-device from the group in which the self-device participates.

8. A communication control method performed by a communication system comprising a base station and a plurality of mobile stations, the communication control method comprising:
   firstly storing group information corresponding to a group assignable to each of the plurality of mobile stations in association with the mobile station, wherein the group information is data defined by a predetermined bit number, and the firstly storing is performed by the base station;

transmitting the group information, which is associated to the mobile station and stored by the firstly storing, to the mobile station according to an authentication request from the mobile station, wherein the call information is data defined by a predetermined bit number, and the transmitting is performed by the base station;

secondly storing group information received from the base station, wherein the secondly storing is performed by each of the plurality of mobile stations;

generating call information defining a group requesting the mobile station to participate, wherein the generating is performed by the base station;

transmitting the generated call information to the mobile station, wherein the transmitting is performed by the base station;

determining, according to an operation result of the group information and the call information, whether a group defined by call information received from the base station includes a group corresponding to the group information stored by the secondly storing, wherein the determining is performed by each of the plurality of mobile stations;

making a self-device participate in the group determined to be included by the determining, wherein the participating is performed by each of the plurality of mobile stations; and transmitting and receiving data to and from the mobile station forming the group in which the self-device participates, wherein the transmitting and receiving is performed by each of the plurality of mobile stations.

9. A mobile station of a communication system comprising a base station and a plurality of mobile stations, the mobile station comprising:

a storage unit which stores group information corresponding to a group assignable to a self-device;

a determining unit which determines whether a group requested to participate and defined by call information received from the base station includes a group corresponding to the group information stored in the storage unit;

a controller which makes a self-device participate in the group determined to be included by the determining unit; and a communicator which transmits and receives data to and from the mobile station forming the group in which the self-device participates, wherein the group information and the call information are data defined by a predetermined bit number, and wherein the determining unit determines, according to an operation result of the group information and the call information whether the group requested to participate and defined by the call information includes the group corresponding to the group information.

10. A base station of a communication system comprising a base station and a plurality of mobile stations, the base station comprising:

a storage unit which stores group information corresponding to a group assignable to each of the plurality of mobile stations in association with the mobile station;

a generator which generates call information making the mobile station participate in the group including the group corresponding to the group information;

a group information transmitter which transmits the group information associated with each of the plurality of mobile stations and stored in the storage unit to the mobile station according to an authentication request from the mobile station; and a call information transmitter which transmits the call information generated by the generator to the mobile station, wherein the group information and the call information are data defined by a predetermined bit number so that at least one of the mobile stations determines, according to an operation result of the group information and the call information, whether the group defined by the call information includes the group corresponding to the group information.

* * * * *